(12) United States Patent
     Alexander (10) Patent No.: US 9,825,934 B1
(45) Date of Patent: Nov. 21, 2017

(54) OPERATING SYSTEM INTERFACE FOR CREDENTIAL MANAGEMENT

(71) Applicant: Google Inc., Mountain View, CA (US)

(72) Inventor: Eldridge Lee Alexander, San Jose, CA (US)

(73) Assignee: Google Inc., Mountain View, CA (US)

( * ) Notice: Subject to any disclaimer, the term of this patent is extended or adjusted under 35 U.S.C. 154(b) by 121 days.

(21) Appl. No.: 14/498,668

(22) Filed: Sep. 26, 2014

(51) Int. Cl.
   | | |
   |---|---|
   | *G06F 21/41* | (2013.01) |
   | *H04L 29/06* | (2006.01) |
   | *G06F 17/24* | (2006.01) |
   | *H04L 9/32* | (2006.01) |

(52) U.S. Cl.
   CPC ........ *H04L 63/0815* (2013.01); *G06F 17/243* (2013.01); *G06F 21/41* (2013.01); *H04L 9/3226* (2013.01); *H04L 63/083* (2013.01); *H04L 63/0861* (2013.01)

(58) Field of Classification Search
   CPC ..... G06F 21/41; G06F 17/243; H04L 9/3226; H04L 63/083
   See application file for complete search history.

(56) References Cited

U.S. PATENT DOCUMENTS

| | | | | |
|---|---|---|---|---|
| 2003/0065940 | A1* | 4/2003 | Brezak | H04L 63/0815 726/4 |
| 2004/0193813 | A1* | 9/2004 | Nguyen | G06F 9/445 711/156 |
| 2007/0269041 | A1* | 11/2007 | Bhatnagar | H04L 12/58 380/30 |
| 2008/0092215 | A1* | 4/2008 | Soukup | H04L 63/0815 726/5 |
| 2013/0174241 | A1* | 7/2013 | Cha | H04L 63/0815 726/7 |
| 2013/0318591 | A1* | 11/2013 | Zhu | H04L 9/321 726/8 |
| 2014/0096213 | A1* | 4/2014 | Quan | H04W 12/06 726/7 |

(Continued)

OTHER PUBLICATIONS

McCarney et al., "Tapas: Design. Implementation, and Usability Evaluation of a Password Manager", 2012, pp. 89-98.*

(Continued)

*Primary Examiner* — Thaddeus Plecha
(74) *Attorney, Agent, or Firm* — McDermott Will & Emery LLP (57) ABSTRACT

A computer-implemented method for providing an operating system level interface for communicating credential data between applications includes detecting, by an operating system, a field configured to receive an authentication credential and identifying a credential management application configured to provide authentication credentials. The method includes requesting, by the operating system and using an operating system interface configured to communicate authentication credentials, the authentication credential from the credential management application. And when the credential management application provides the authentication credential using the operating system interface configured to communicate authentication credentials, the method includes providing the authentication credential for entry into the field.

20 Claims, 8 Drawing Sheets

(56) References Cited

U.S. PATENT DOCUMENTS

| | | | |
|---|---|---|---|
| 2014/0157390 A1* | 6/2014 | Lurey | G06F 21/123 726/7 |
| 2014/0195888 A1* | 7/2014 | Alford, Jr. | G06F 17/243 715/226 |
| 2014/0250511 A1* | 9/2014 | Kendall | H04L 63/0815 726/6 |
| 2015/0172925 A1* | 6/2015 | Leppanen | H04W 12/04 726/7 |
| 2015/0178521 A1* | 6/2015 | Ching | G06K 5/00 235/375 |
| 2015/0348015 A1* | 12/2015 | Ren | G06Q 20/3226 705/41 |

OTHER PUBLICATIONS

Yee et al., "Passpet: Convenient Password Management and Phishing Protection", 2006, pp. 32-43.*

* cited by examiner

OPERATING SYSTEM INTERFACE FOR CREDENTIAL MANAGEMENT

BACKGROUND

Field

The present disclosure relates to methods and systems for handling, by the operating system of personal computing devices, authentication credentials used by credential management applications.

Description of Related Art

Users with personal computing devices such as computers, smartphones, or tablets commonly access their accounts online with service providers by providing authentication credentials to a webpage or application associated with the service provider. Examples of these service providers include banking and other financial services, social networking providers, online retail stores and services, and media content providers, among others. Authentication credentials typically include a login name and a password or code that is a combination unique to the user and for the service provider. It is often difficult for users to remember all of their login name and password combinations for the multiple service providers they use. Thus, in order to handle the multiple passwords, a variety of credential management applications exist that securely store multiple authentication credentials and provide the credentials when a user is attempting to access a corresponding service or website. These credential management applications typically consume large amounts of computer resources as they ideally operate continuously in the background. Also, credential management applications often collect and store large amounts of network traffic information, such as web site browsing data, raising privacy and security concerns for users. Due to limited computational capabilities of mobile devices, however, in some instances credential management applications may freeze or simply stop working, missing potentially important credential request events as the user attempts to access certain websites. Also, security concerns are raised when the user's authentication credentials are transmitted over a computational layer that is accessible to other applications or to malware, such as where the user's login name or password is placed on a clipboard from which the data can easily be lifted by another application. Thus, the secured information may be vulnerable to attacks when in transit from the credential management application running in the application layer to a web browser application of the user device.

SUMMARY

According to one embodiment of the present disclosure a computer-implemented method for providing an operating system level interface for communicating credential data between applications is provided. The method includes detecting, by an operating system, a field configured to receive an authentication credential, and identifying a credential management application configured to provide authentication credentials. The method also includes requesting, by the operating system and using an operating system interface configured to communicate authentication credentials, the authentication credential from the credential management application. And when the credential management application provides the authentication credential using the operating system interface configured to communicate authentication credentials, the method includes providing the authentication credential for entry into the field.

According to one embodiment of the present disclosure a system for providing an operating system level interface for communicating credential data between applications is provided. The system includes a memory comprising instructions and a processor configured to execute the instructions. The instructions cause the processor to detect, by an operating system, a field configured to receive an authentication credential and retrieve an identification parameter of a service provider requesting the authentication credential. The instructions further cause the processor to identify a credential management application configured to provide authentication credentials, and request, by the operating system and using an operating system interface configured to communicate authentication credentials, the authentication credential from the credential management application using the identification parameter of the service provider. When the credential management application provides the authentication credential using the operating system interface configured to communicate authentication credentials, the instructions cause the processor to provide the authentication credential for entry into the field.

According to one embodiment, a non-transitory machine-readable medium storing commands is provided. The commands, when executed by a processor in a personal computing device, cause the personal computer device to perform a method. The method includes detecting, by an operating system, a field configured to receive an authentication credential and identifying a credential management application configured to provide authentication credentials. The method also includes receiving an identification parameter of a service provider requesting the authentication credential, and requesting, by the operating system and using an operating system interface configured to communicate authentication credentials, the authentication credential from the credential management application using the identification parameter of the service provider. When the credential management application is inactive, the method includes the operating system loading the credential management application in response to the request, and when the credential management application provides the authentication credential using the operating system interface configured to communicate authentication credentials, the method includes providing the authentication credential for entry into the field.

According to one embodiment of the present disclosure a system for providing an operating system level interface for communicating credential data between applications is provided. The system includes a means for storing instructions and a means to execute the instructions. The instructions cause the system to detect, by an operating system, a field configured to receive an authentication credential and retrieve an identification parameter of a service provider requesting the authentication credential. The instructions further cause the system to identify a credential management application configured to provide authentication credentials, and request, by the operating system and using an operating system interface configured to communicate authentication credentials, the authentication credential from the credential management application using the identification parameter of the service provider. When the credential management application provides the authentication credential using the operating system interface configured to communicate authentication credentials, the instructions cause the system to provide the authentication credential for entry into the field. Further according to some embodiments, the system includes a means for providing a re-authentication credential to the credential management application, the re-authentication credential including one of a personal identification number (PIN), a fingerprint, a retina scan, or a second factor authentication device.

BRIEF DESCRIPTION OF THE DRAWINGS

In the figures, elements with the same or similar reference numerals have the same or similar function or steps, unless otherwise indicated.

DETAILED DESCRIPTION

In the following detailed description, numerous specific details are set forth to provide a full understanding of the present disclosure. It will be apparent, however, to one ordinarily skilled in the art that the embodiments of the present disclosure can be practiced without some of these specific details. In other instances, well-known structures and techniques have not been shown in detail so as not to obscure the disclosure.

The present disclosure relates to methods and systems for handling, by the operating system of personal computing devices, authentication credentials used by credential management applications. More particularly, the present disclosure relates to a secure password communication interface configured for operating systems to communicate authentication credentials to or from a credential management application, such as a third party credential management application. In certain aspects, authentication credentials are provided to or from the credential management application upon the user providing appropriate authentication to the credential management application ("first factor user authentication"), if required. In some embodiments, for example, detection by the operating system of a password field in an application or web browser run on the device may prompt the operating system to request the appropriate password from a credential management application. Accordingly, in some embodiments the credential management application may be inactive or not loaded when the password request is generated, and the operating system may load or otherwise activate the credential management application in response to detecting the password field in order to request and retrieve the appropriate authentication credentials from the credential management application to supply to the application or web browser.

Figure 1:
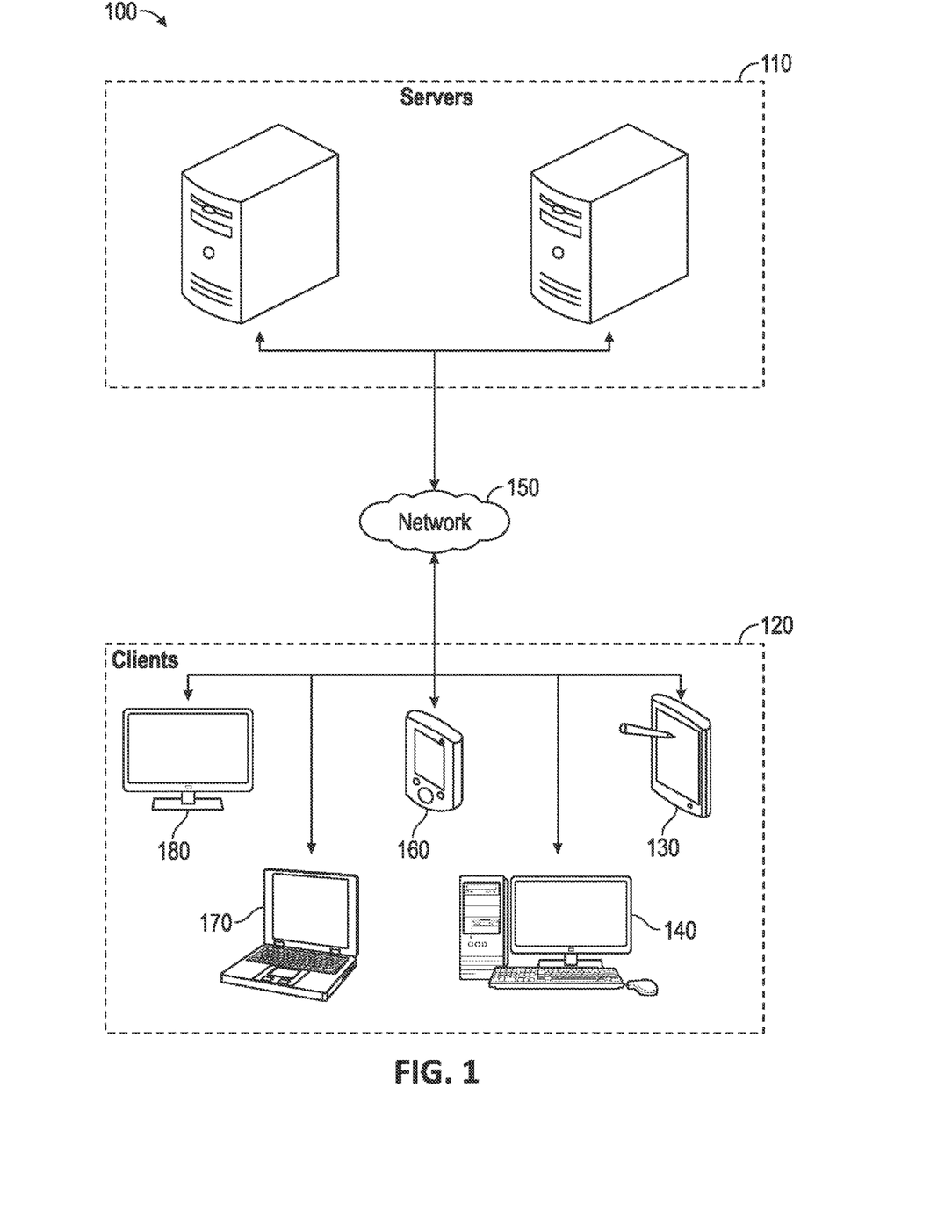
FIG. 1 illustrates an example architecture including systems for handling, by the operating system of personal computing devices, authentication credentials used by credential management applications, according to some embodiments.

FIG. 1 illustrates an example architecture 100 including systems for handling, by an operating system of personal computing devices 120, authentication credentials used by a credential management application installed in the personal computing device, according to some embodiments. The credential management application handles user authentication credentials to a webpage or applications associated with a service provider hosted in one of a plurality of servers 110. Servers 110 and personal computing devices 120 are connected over a network 150. Each of personal computing devices 120 is configured to include and execute an application for displaying content (e.g., a mobile 'app'). The application can be, for example, for a web browser, for a financial institution, for a social networking provider, for online retail stores and services, or for a media content provider, among others. Personal computing devices 120 can be, for example, a tablet computer 130 (e.g., including e-book readers), a desktop computer 140, a mobile device 160 (e.g., a smartphone or PDA), a personal computer device 170, a set top box 180 (e.g., for a television), or any other device having appropriate processor, memory, and communications capabilities for displaying content (e.g., a wearable computer). More generally, personal computing devices 120 are associated with registered users of one or more of servers 110.

In certain aspects, a service provider may be hosted on one or more servers 110 accessible over network 150. Servers 110 can be any device having an appropriate processor, memory, and communications capability for hosting, storing, and processing the content provided to personal computing devices 120. Network 150 can include, for example, any one or more of a personal area network (PAN), a local area network (LAN), a campus area network (CAN), a metropolitan area network (MAN), a wide area network (WAN), a broadband network (BBN), the Internet, and the like. Further, network 150 can include, but is not limited to, any one or more of the following network topologies, including a bus network, a star network, a ring network, a mesh network, a star-bus network, tree or hierarchical network, and the like.

Figure 2:
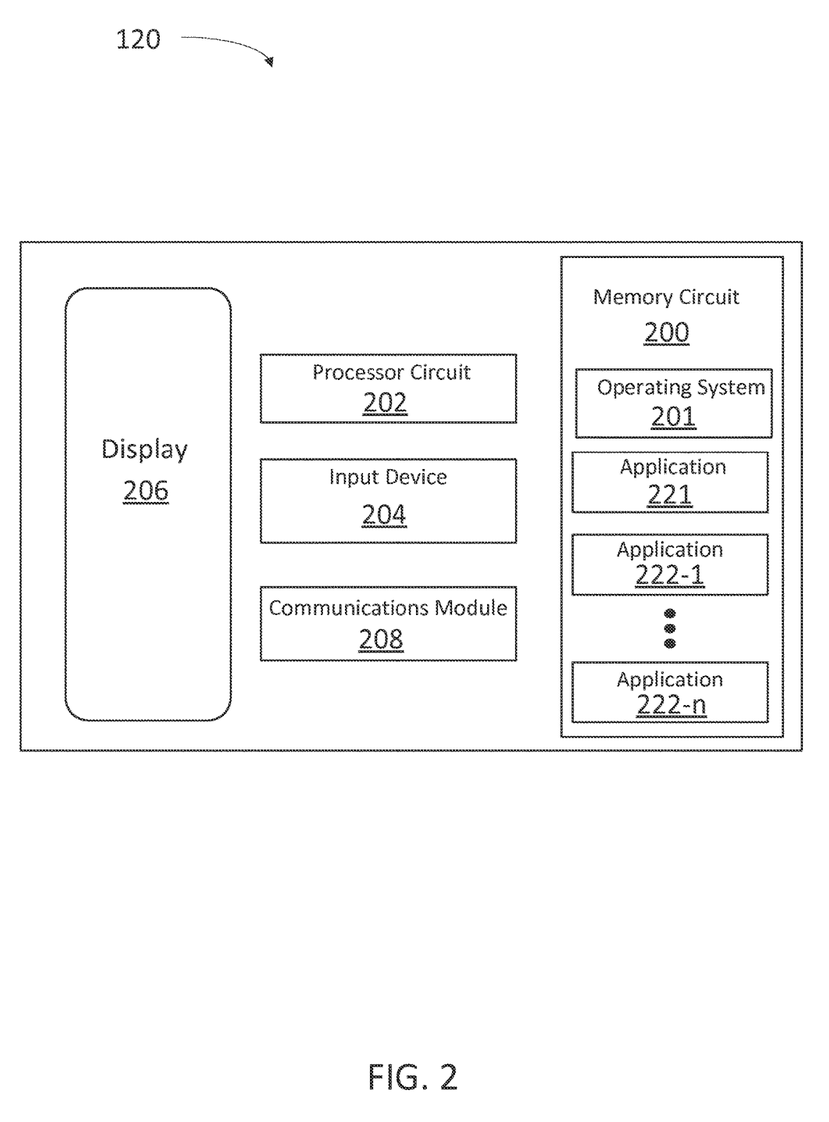
FIG. 2 illustrates the personal computing device of FIG. 1 including a display, a processor circuit, and a memory circuit, according to some embodiments.

FIG. 2 illustrates a personal computing device 120 including a memory 200, a processor 202 and a display 206, according to some embodiments. In some embodiments, display 206 is a touch sensitive display. Personal computing device 120 also includes an input device 204, and a communications module 208.

Processor 202 is configured to execute commands stored in memory 200 so that personal computing device 120 performs steps in methods consistent with the present disclosure. Input device 204 is, for example, a keyboard. In some embodiments input device 204 includes a mouse or a pointer device. In some embodiments, input device 204 is configured to operate in parallel with a touch screen in display 206. Communications module 208 is configured to couple personal computing device 120 with network 150 and access network server 110. In some embodiments, communications module 208 is configured to couple personal computing device 120 with an external device used to authenticate the identity of a user accessing personal computing device 120. Accordingly, communications module 208 can include wireless circuits and devices, such as Radio-Frequency (RF) antennas, transmitters, receivers, and transceivers. In some embodiments, communications module 208 includes an optical fiber cable, or a wire cable, configured to transmit and receive signals to and from network 150, or a near-field (NF) sensor.

Memory 200 includes a credential management application 221. In some embodiments, credential management application 221 includes a password manager application. While FIG. 2 illustrates one credential management application 221, some embodiments include a plurality of credential management applications 221, without departing from the scope of the present disclosure. Memory 200 may include a first application 222-1, a second application 222-2, and any number of applications up to 222-n (hereinafter collectively referred to as 'applications 222') where 'n' is any integer. Applications 222 include data and commands which, when executed by processor 202, cause device 120 to perform operations including transmitting and receiving data and commands to and from a server 110 through network 150. In that regard, each of applications 222 provides a window in display 206 for an interactive platform between a user and personal computing device 120.

Memory 200 includes an operating system 201 that manages operation of the hardware in personal computing device 120 according to commands stored in application programs installed in memory 200, such as application 221 and applications 222-1 through 222-n. In some embodiments, application 221 is a credential management application handling credentials for user access to one or more of applications 222-1 through 222-n. Furthermore, application 221 may be one of a plurality of credential management applications. Applications 222-1 through 222-n (hereinafter collectively referred to as applications 222) may be any number 'n' of applications installed in memory 200, including services provided to the user through private accounts having a login name and a password. In that regard, credential management application 221 may include a table having a list of passwords and login names correlated with a list of services provided by each of applications 222. In some embodiments, by addressing a name or any other identifier of one of applications 222, credential management application 221 retrieves a login name, a password, or any other authentication credential associating the user with a private account in the service provided by the application. Moreover, in some embodiments a credential retrieved by credential management application 221 gives the user direct access to a service provided by one of applications 222.

Figure 3:
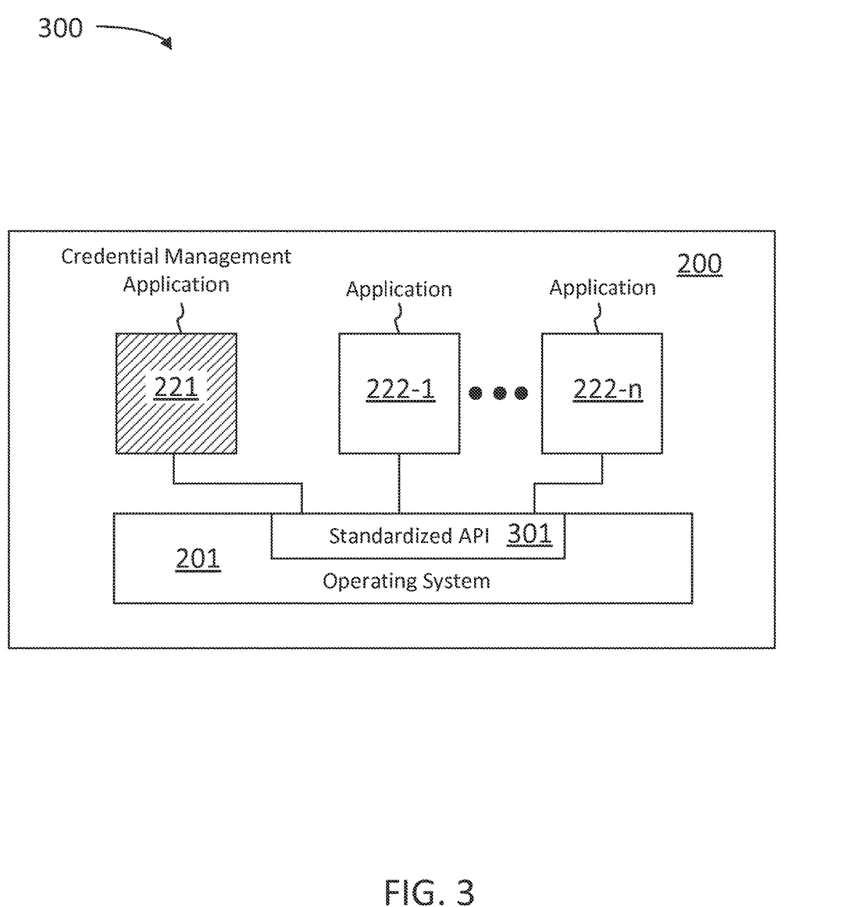
FIG. 3 illustrates a block diagram of a memory including an operating system having a standardized Application Program Interface (API), according to some embodiments.

FIG. 3 illustrates a block diagram of memory 200 including an operating system 201 having a standardized Application Program Interface (API) 301, according to some embodiments. Credential management application 221 and applications 222 have been described in detail above. Standardized API 301 includes commands and instructions that enable communication between installed applications (e.g., credential management application 221 and applications 222) and operating system 201. More generally, standardized API 301 is an operating system interface enabling operating system 201 to receive data and commands from installed applications in memory 200. Accordingly, standardized API 301 is configured to communicate authentication credentials between applications 222 and operating system 201, and between operating system 201 and credential management application 221.

Systems consistent with the present disclosure make efficient use of computational resources. Indeed, credential management application 221 may be inactive while operating system 201 detects user activity accessing an application 222 that prompts for a credential input. In such event, operating system 201 may load and activate credential management application 221 to provide the requested credential. Also, handling the user's access credentials via operating system 201 enhances security of the user's personal information by reducing the exposure of sensitive information to external traffic. Embodiments consistent with the present disclosure reduce monitoring of user activity by third party applications, such as credential management application 221 or by applications 222 because the monitoring is performed by operating system 201. Moreover, embodiments of the present disclosure limit the number of privileges provided to applications 221 and 222 in the application layer. Methods and embodiments of systems as disclosed herein provide persistent and consistent availability of a credential management system when needed by the user. Accordingly, methods and systems as disclosed herein reduce the use of peripheral hardware or software such as the clipboard or input device 204 (e.g., a keyboard) to transmit passwords and other sensitive information. Because peripheral traffic is easier to phish and intercept by malicious software, some embodiments reduce the exposure of sensitive information to peripheral traffic.

Figure 4:
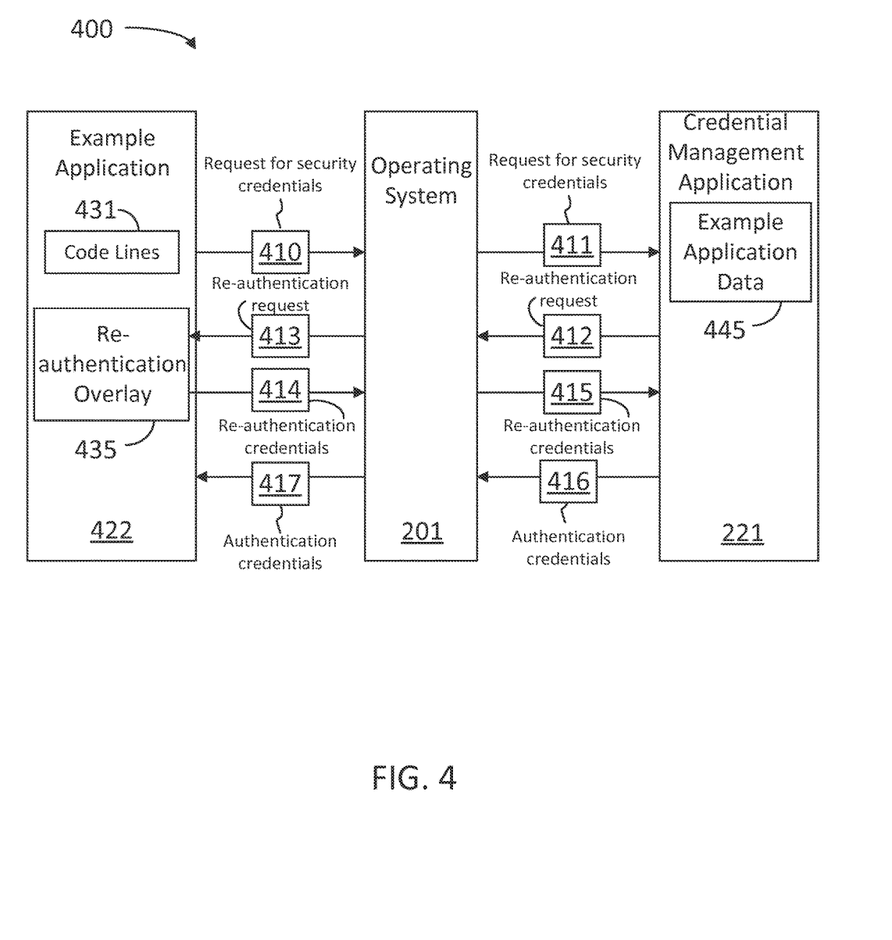
FIG. 4 illustrates a block diagram of an operating system performing a credential management in a personal computing system, according to some embodiments.

FIG. 4 illustrates a block diagram 400 of an operating system 201 performing credential management in personal computing device 120, according to some embodiments. Block diagram 400 includes an example application 422 and credential management application 221 interacting with operating system 201. Accordingly, example application 422 may be any one of applications 222, including without limitation a web browser, and credential management application 221 may be as described in detail above (cf. FIG. 2). Operating system 201 detects code lines 431 including a request by example application 422 for authentication credentials 410 from the user. Code lines 431 are indicative of a credential request by example application 422 and include command lines such as any one of the below command lines in hyper-text markup language (html):

<html>
<input type='text' name='user'> (this could also include 'e-mail' address or similar)
<form type='password' name='pwd'>
</html>

It is understood that embodiments consistent with the present disclosure may use a different type of code language to communicate with operating system 201, such as JavaScript. Accordingly, in some embodiments operating system 201 is configured to detect a call for an authentication credential in JavaScript. In that regard, embodiments consistent with the present disclosure offer the advantage that web developers writing code for applications 422 may not incorporate any modifications to already existing code for requesting authentication credentials, either in HTML, JavaScript, or any other programming framework. In some embodiments, it may be desirable that when application 422 detects code lines 431 including a request for authentication credentials 410 from the user, application 422 notifies standardized API 301 in operating system 201 of the authentication request. Other configurations include API 301 searching and detecting authentication credential requests in all active applications running in the personal computing device.

Continuing to describe FIG. 4, operating system 201 transmits a request for authentication credentials 411 to credential management application 221. Credential management application 221 finds an example application data 445 that correlates example application 422 with the corresponding user authentication credentials. In some embodiments, credential management application 221 uses an identification parameter of the service provider requesting the authentication credential, to find example application data 445 (e.g., 'Bank of A,' 'Friendly Hangouts,' and the like).

Some embodiments include a second factor user authentication protocol when the appropriate authentication credentials are provided by the operating system to the application or web browser. In some embodiments, the second factor user authentication protocol includes a re-authentication request 412 transmitted from credential management application 221 to operating system 201 before the authentication credentials are provided to the application. Operating system 201 transmits re-authentication request 413 to example application 422, where the re-authentication request is displayed in a re-authentication overlay 435. The re-authentication protocol includes, for example, a personal identification number (PIN), a fingerprint identification, a retina scan, or other biometric reading. In this regard, methods and systems consistent with the present disclosure are adapted to incorporate by the operating system new user authentication technologies as they are made available, thus obviating a need for the credential management application to independently incorporate the new user authentication technologies.

In this regard, re-authentication requests consistent with embodiments as disclosed herein not only apply to PINs and biometrics. More generally, embodiments consistent with the present disclosure accommodate new technologies including a Universal Second Factor (U2F) protocol. For example, in a U2F protocol an internet user carries a non-phishable strong second factor device which the user can register at any supporting site to get strong authentication security. In embodiments supporting such environments, internet service providers managing example application 422 are configured to accept and support the second factor device as an authentication source. Accordingly, embodiments consistent with the present disclosure may implement a re-authentication request wherein personal computing device 120 is configured to communicate with the second factor device and validate a re-authentication request.

Example application 422 transmits re-authentication credentials 414 input by the user or communicated by a second factor device, to operating system 201. Operating system 201 transmits re-authentication credentials 415 to credential management application 221. In some embodiments, the re-authentication credentials 414 transmitted from example application 422 to operating system 201 are the same as or similar to re-authentication credentials 415 transmitted from operating system 201 to credential management application 221. In some embodiments, re-authentication credentials 415 transmitted from operating system 201 to credential management application 221 are different from re-authentication credentials 414. For example, in some embodiments re-authentication credentials 415 include a validation of re-authentication credentials 414 by operating system 201. Credential management application 221 transmits user authentication credentials 416 to operating system 201 when the re-authentication credentials are validated. Authentication credentials 416 may include a login name and a password. The password in authentication credentials 416 may be a long string of alpha-numeric characters. Operating system 201 transmits authentication credentials 417 to example application 422.

A string including authentication credentials 417 may be encoded, redacted, or blocked from view by the user or any third party having access to the display and other peripheral components in personal computing device 120. In some embodiments, the format of authentication credentials 417 from operating system 201 is plain text after decryption by credential management application 221, where the text is not reachable by any of the peripheral devices (including display 206 or input device 204), or the clipboard, as the communication between operating system 201 and application 422 is restricted to root. Accordingly, application 422 is notified of the authentication when authentication credentials 417 are pasted into an input string, in the manner of legacy credentials. An exemplary format of authentication credentials 417 provided by operating system 201 to application 422 in HTML code may be as follows:

<input type='text' name='Username'> (this could also include name='email' or similar)
<input type='password' name='password'>

When authentication credentials 417 are provided, a service provider grants the user access to the services managed by example application 422.

Figure 5A:
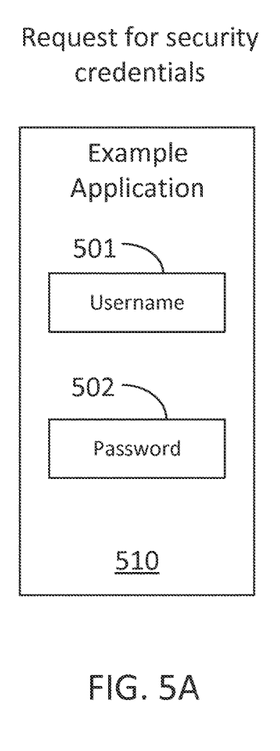
FIG. 5A illustrates a display in a request for authentication credentials, according to some embodiments.

FIG. 5A illustrates a display 510 in a request for authentication credentials 410, according to some embodiments. Display 510 may include a username field 501 and a password field 502.

Figure 5B:
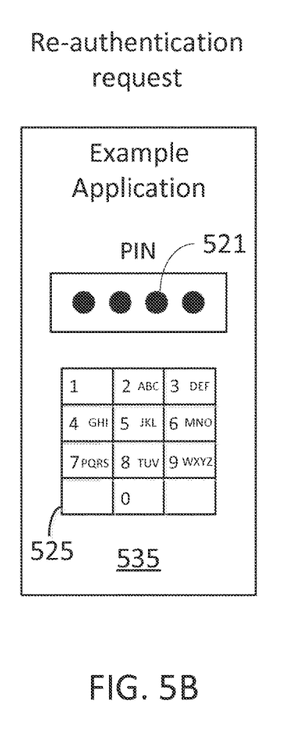
FIG. 5B illustrates a display in a re-authentication request, according to some embodiments.

FIG. 5B illustrates a re-authentication overlay 535 displaying a re-authentication request, according to some embodiments. Re-authentication overlay 535 may include a PIN field 521 and an input tool 525, so the user can input a PIN into PIN field 521. While overlay 535 specifically illustrates a PIN type of re-authentication request, embodiments consistent with the present disclosure include second factor authentication protocols such as a biometric protocol, or a U2F protocol. For example, in the case of a biometric protocol, overlay 535 includes a field to collect a fingerprint from the user, or a request to collect a retina scan from the user. In embodiments using a U2F protocol, overlay 535 includes a request for the user to couple a second factor device with personal computing device 120. In some embodiments, coupling the second factor device with personal computing device 120 includes a direct wire connection to an outlet in personal computing device 120, such as a universal serial bus (USB) connector. Some embodiments include a second factor device that wirelessly couples with personal computing device 120 via radio-frequency (RF) signaling (e.g., with communications module 208). For example, in some embodiments overlay 535 may include a request for the user to tap or move the second factor device against or in close proximity to a near-field sensor included in communications module 208.

Figure 5C:
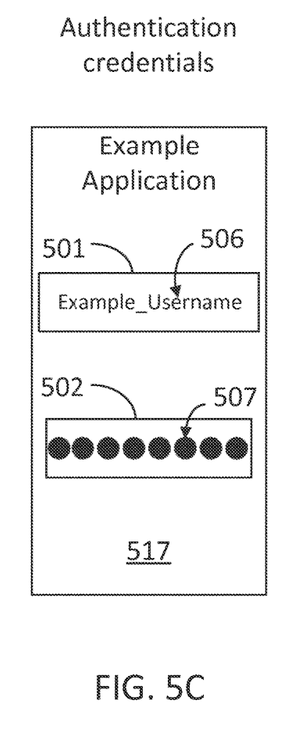
FIG. 5C illustrates a display of authentication credentials, according to some embodiments.

FIG. 5C illustrates a display 517 of authentication credentials 417, according to some embodiments. Display 517 is display 510 with username field 501 and password field 502 filled out with the requested authentication credentials. Display 517 includes username field 501 filled accordingly with data 506 provided by credential management application 221 via operating system 201. Display 517 also include a password field 502 filled with a password 507 provided by credential management application 221 via operating system 201. In embodiments consistent with the present disclosure, operating system 201 provides a redacted password 507 in order to protect the password string from third parties having access to any of the peripheral devices in personal computer 120 such as display 206, or input device 204. Accordingly, embodiments consistent with the present disclosure provide an extra layer of security to the credential management protocol between the user and example application 422. In particular, embodiments as disclosed herein provide requested authentication credentials 417 to example application 422 without the authentication credentials going through input device 204, or appearing on display 206.

Figure 6:
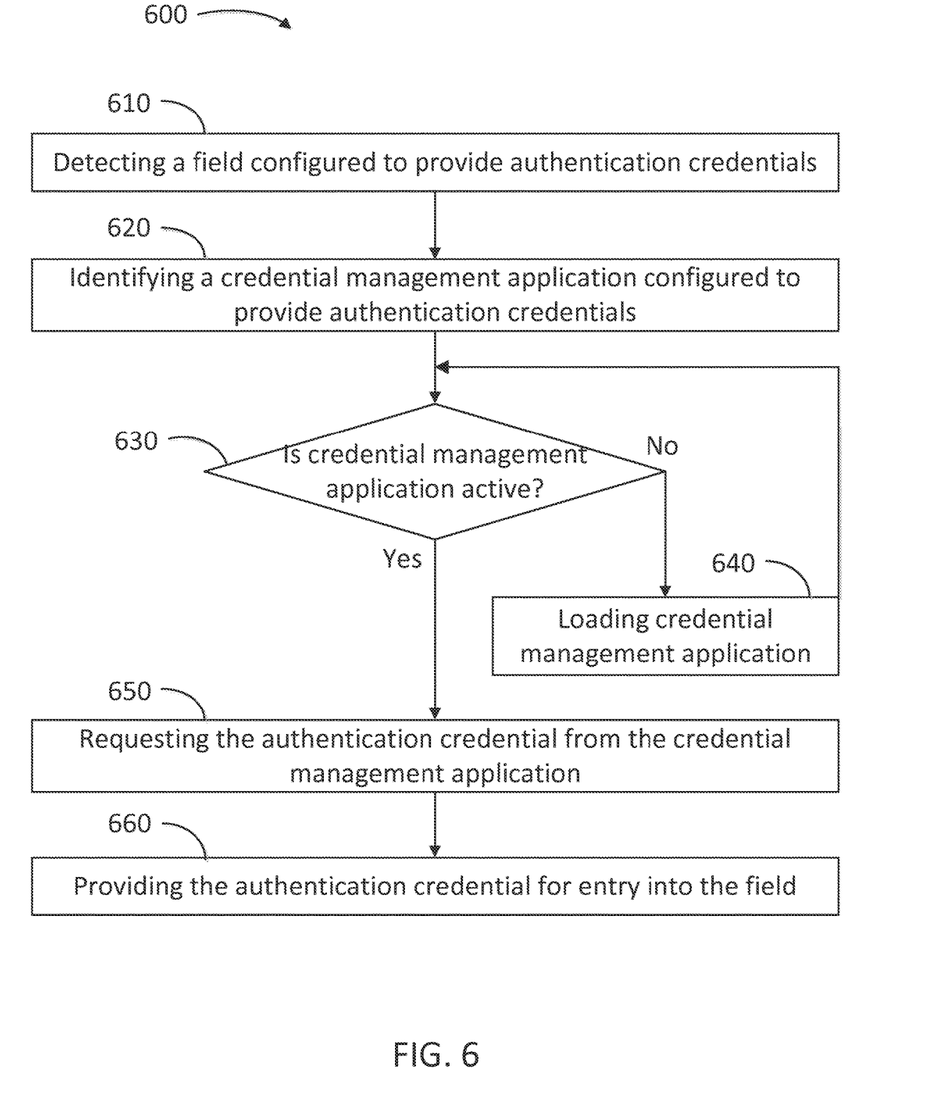
FIG. 6 illustrates a flow chart in a method for credential management, according to some embodiments.

FIG. 6 illustrates a flow chart in a method 600 for credential management, according to some embodiments. Steps in method 600 can be performed by a processor in a computer, the processor executing commands stored in a memory of the computer. In some embodiments, the computer in method 600 is a personal computing device (e.g., personal computing device 120). Accordingly, steps in method 600 can be partially or completely performed by processor 202 in personal computing device 120, executing commands stored in memory 200. In some embodiments of method 600 the memory includes an operating system and a plurality of applications installed in the memory (e.g., operating system 201, credential management application 221, and applications 222). The commands performed by the processor in at least some steps in method 600 may be part of the operating system or of any one of the credential management application or other applications installed in the memory circuit. The personal computing device includes a display (e.g., display 206), which in some embodiments is touch sensitive, and a communications module (e.g., communications module 208), according to some embodiments. Embodiments consistent with method 600 include at least one of the steps illustrated in FIG. 6 performed in any order. Furthermore, in some embodiments consistent with method 600, steps illustrated in FIG. 6 are performed simultaneously in time, or approximately simultaneously in time. Accordingly, in some embodiments consistent with method 600, steps in FIG. 6 are performed at least partially overlapping in time. Moreover, in some embodiments consistent with method 600, other steps can be included in addition to at least one of the steps illustrated in FIG. 6.

Step 610 includes detecting a field configured to provide authentication credentials. In some embodiments, step 610 includes the operating system monitoring activity of each of the applications installed in the memory circuit. Accordingly, step 610 may include the operating system in the personal computing device detecting code lines in an active application (e.g., code lines 431) indicative of a password request. Further, in some embodiments step 610 includes the operating system receiving the request for authentication credentials (e.g., request 410) from the active application. Step 620 includes identifying a credential management application configured to provide authentication credentials. In some embodiments step 620 includes scanning request 410 by the operating system to find an identification parameter of a service provider associated with the active application. Step 630 includes determining that the credential management application is active. When the credential management application is not active according to step 630, step 640 includes loading the credential management application. And when the credential management application is active according to step 630, step 650 includes requesting the authentication credential from the credential management application. In some embodiments, step 650 includes the operating system incorporating the identifier of the service provider associated with the active application in the request for authentication credentials (e.g., request 411).

Step 660 includes providing the authentication credentials for entry into the field detected in step 610. Accordingly, some embodiments include filling the field detected in step 610 with a redacted text, so that the content of the authentication credential is not compromised by a third party having visual access to the display, or having remote access to a peripheral device or application in the personal computer device. In embodiments consistent with the present disclosure, step 660 is performed by the operating system in the personal computing device.

Figure 7:
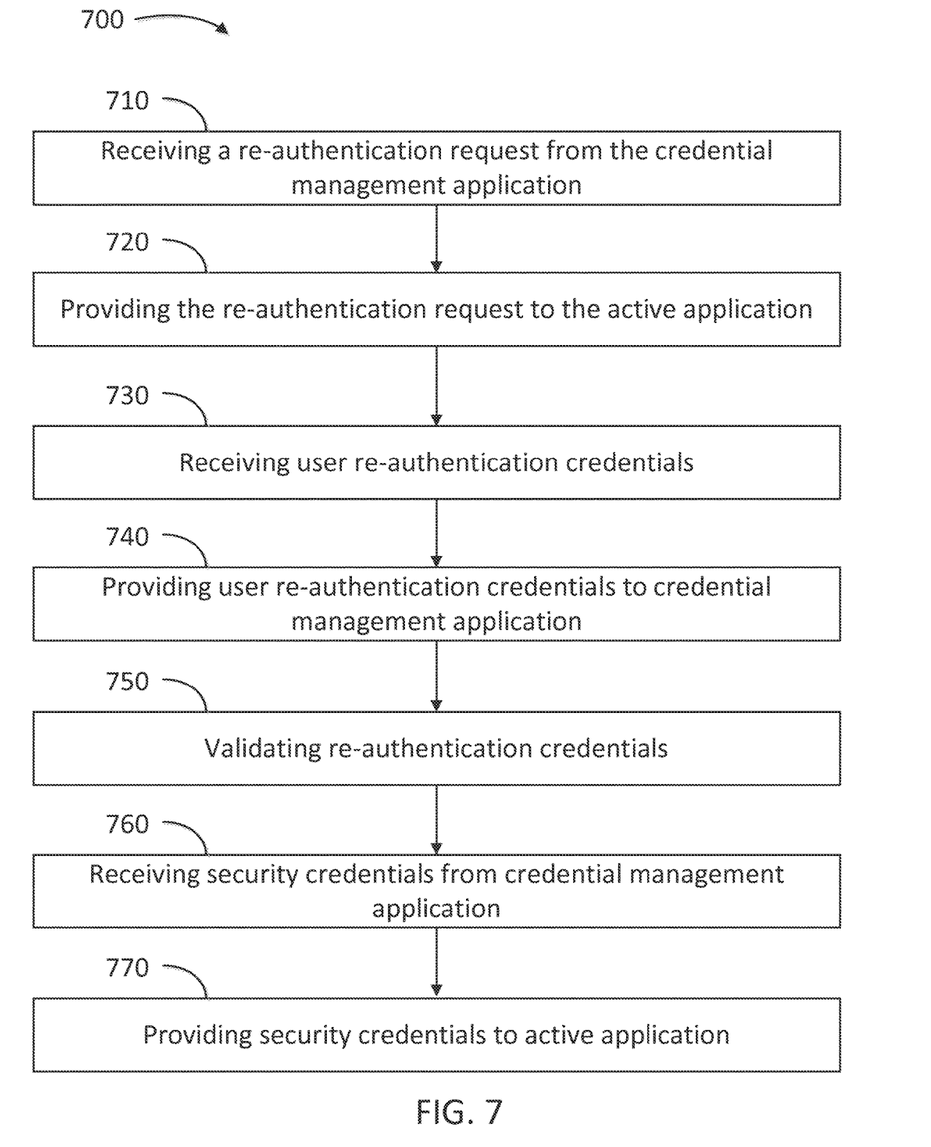
FIG. 7 illustrates a flow chart in a method for credential management including a second factor user authentication protocol, according to some embodiments.

FIG. 7 illustrates a flow chart in a method 700 for credential management including a second factor user authentication protocol, according to some embodiments. Steps in method 700 can be performed by a processor in a computer, the processor executing commands stored in a memory of the computer. The computer in method 700 is a personal computing device (e.g., personal computing device 120). Accordingly, steps in method 700 can be partially or completely performed by processor 202 in personal computing device 120 executing commands stored in memory 200. In some embodiments of method 700, the memory includes an operating system and a plurality of applications installed in the memory (e.g., operating system 201, credential management application 221, and applications 222). The commands performed by the processor in at least some steps in method 700 may be part of the operating system or of any one of the credential management application or other applications installed in the memory circuit. The personal computing device includes a display (e.g., display 206), which in some embodiments is touch sensitive, and a communications module (e.g., communications module 208), according to some embodiments. The personal computing device in method 700 is configured to process a second factor user authentication protocol, for example by collecting a user's biometric data. The user's biometric data includes at least one of a finger print, an iris scan, or any other biometric data that uniquely identifies the user. In some embodiments, the personal computing device in method 700 is configured to be coupled with a second factor authentication device, either through a physical connector (e.g., a USB port) or through a wireless connector.

Embodiments consistent with method 700 include at least one of the steps illustrated in FIG. 7 performed in any order. Furthermore, in some embodiments consistent with method 700, steps illustrated in FIG. 7 are performed simultaneously in time, or approximately simultaneously in time. Accordingly, in some embodiments consistent with method 700, steps in FIG. 7 are performed at least partially overlapping in time. Moreover, in some embodiments consistent with method 700, other steps can be included in addition to at least one of the steps illustrated in FIG. 7. For example, in some embodiments method 700 may be performed in the context of step 650 in method 600.

Step 710 includes receiving, by the operating system, a re-authentication request (e.g., request 412) from the credential management application. Step 720 includes providing, by the operating system, the re-authentication request (e.g., request 413) to the active application. Step 730 includes receiving the user re-authentication credentials at a re-authentication overlay in the active application. In some embodiments, step 730 includes receiving the re-authentication credentials (e.g., credentials 414) by the operating system. Step 740 includes providing, by the operating system, re-authentication credentials (e.g., credentials 415) to the credential management application, confirming user's authenticity to the credential management application. Step 750 includes validating the re-authentication credentials. Step 760 includes receiving authentication credentials from the credential management application. Step 770 includes providing authentication credentials to the active application.

Figure 8:
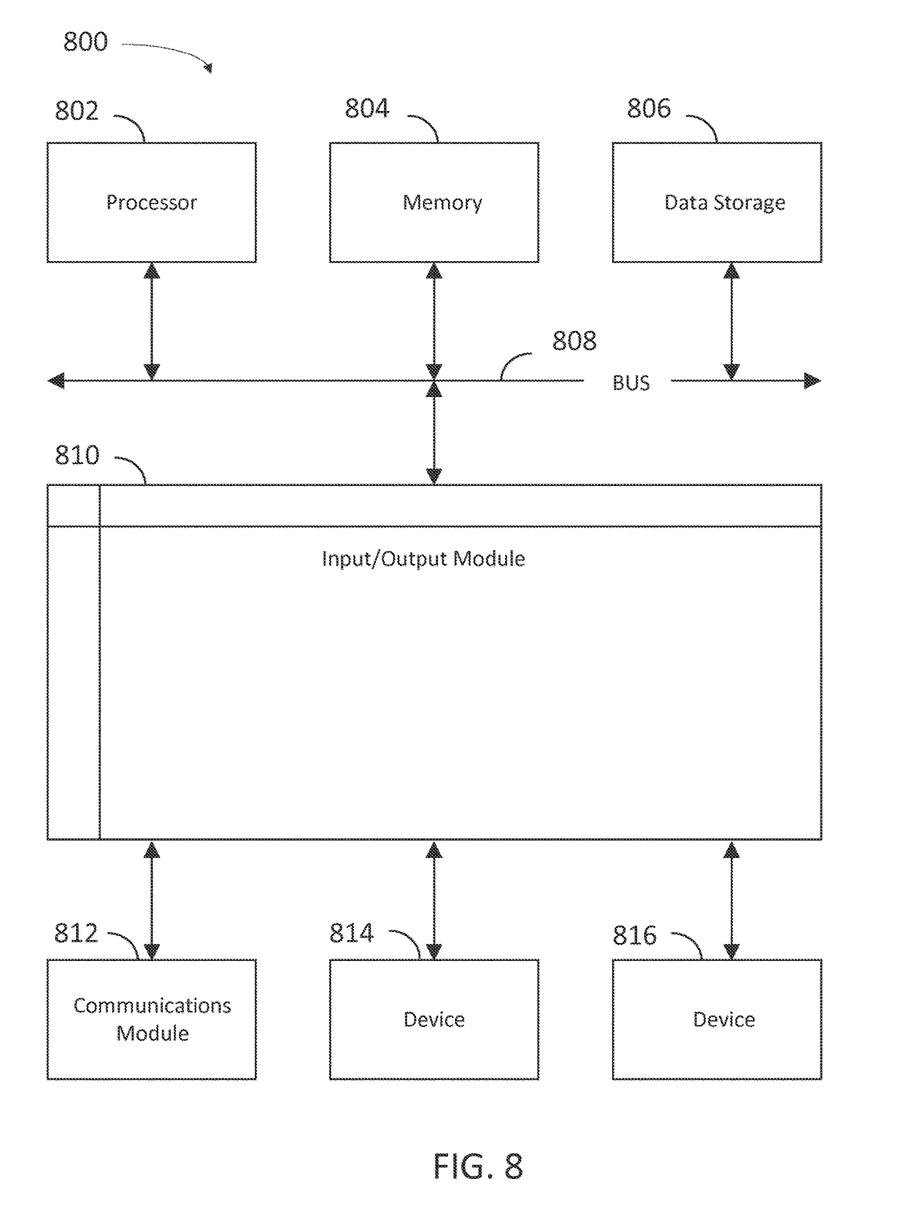
FIG. 8 is a block diagram illustrating an example computer system with which any one of the personal computing devices and servers of FIG. 1 can be implemented.

FIG. 8 is a block diagram illustrating an example computer system 800 with which the personal computing device of FIGS. 1-2 can be implemented. In certain aspects, computer system 800 can be implemented using hardware or a combination of software and hardware, either in a dedicated server, or integrated into another entity, or distributed across multiple entities.

Computer system 800 (e.g., personal computing devices 120 or servers 110) includes a bus 808 or other communication mechanism for communicating information, and a processor 802 (e.g., processor 202) coupled with bus 808 for processing information. By way of example, computer system 800 can be implemented with one or more processors 802. Processor 802 can be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 800 includes, in addition to hardware, code that creates an execution environment for the computer program in question, e.g., code that constitutes processor firmware, a protocol stack, a database management system, an operating system, or a combination of one or more of them stored in an included memory 804 (e.g., memory 200), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 802. Processor 802 and memory 804 can be supplemented by, or incorporated in, special purpose logic circuitry.

The instructions may be stored in memory 804 and implemented in one or more computer program products, i.e., one or more modules of computer program instructions encoded on a computer readable medium for execution by, or to control the operation of, the computer system 800, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, Wirth languages, embeddable languages, and xml-based languages. Memory 704 may also be used for storing temporary variable or other intermediate information during execution of instructions to be executed by processor 802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 800 further includes a data storage device 806 such as a magnetic disk or optical disk, coupled to bus 808 for storing information and instructions. Computer system 800 is coupled via input/output module 810 to various devices. The input/output module 810 is any input/output module. Example input/output modules 810 include data ports such as USB ports. The input/output module 810 is configured to connect to a communications module 812. Example communications modules 812 (e.g., communications module 208) include networking interface cards, such as Ethernet cards and modems. In certain aspects, the input/output module 810 is configured to connect to a plurality of devices, such as an input device 814 (e.g., input device 204) and/or an output device 816 (e.g., display 206). Example input devices 814 include a keyboard and a pointing device, e.g., a mouse or a trackball, by which a user can provide input to the computer system 800. Other kinds of input devices 814 are used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 816 include display devices, such as a LED (light emitting diode), CRT (cathode ray tube), or LCD (liquid crystal display) screen, for displaying information to the user.

According to one aspect of the present disclosure, personal computing device 120 can be implemented using a computer system 800 in response to processor 802 executing one or more sequences of one or more instructions contained in memory 804. Such instructions may be read into memory 804 from another machine-readable medium, such as data storage device 806. Execution of the sequences of instructions contained in main memory 804 causes processor 802 to perform the process steps described herein. One or more processors in a multi-processing arrangement may also be employed to execute the sequences of instructions contained in memory 804. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 800 includes servers and personal computer devices, such as servers 110 and personal computing devices 120, described in detail above. A personal computing device and server are generally remote from each other and typically interact through a communication network. The relationship of client and server arises by virtue of computer programs running on the respective computers and having a client-server relationship to each other. Computer system 800 can be, for example, and without limitation, a desktop computer, laptop computer, or tablet computer. Computer system 800 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 802 for execution. Such a medium may take many forms, including, but not limited to, non-volatile media, volatile media, and transmission media. Non-volatile media include, for example, optical disks, magnetic disks, or flash memory, such as data storage device 806. Volatile media include dynamic memory, such as memory 804. Transmission media include coaxial cables, copper wire, and fiber optics, including the wires that comprise bus 808. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C. To the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
   detecting, in a displayed application by an operating system, a field configured to receive an authentication credential;
   in response to detecting the field and before the field receives the authentication credential:
   1) identifying, by the operating system, a credential management application configured to provide the authentication credential,
   2) requesting, by the operating system, the authentication credential from the credential management application, and
   3) receiving, at the operating system, the requested authentication credential; and providing, by the operating system, the authentication credential for entry into the field as a redacted text inaccessible to a peripheral device.

2. The method of claim 1, further comprising, in response to the operating system requesting the authentication credential:
   requesting an authenticated personal identification number from a user prior to providing the authentication credential for entry into the field; and
   receiving the authenticated personal identification number.

3. The method of claim 1, wherein requesting the authentication credential comprises searching by the credential management application for the authentication credential in a database of authentication credentials using an identifier of a service provider associated with the detected field.

4. The method of claim 1, wherein identifying the credential management application comprises:
   determining, by the operating system that the credential management application is inactive; and
   loading the credential management application.

5. The method of claim 1, wherein the field is configured to provide the authentication credential to a remote server providing a service.

6. The method of claim 1, further comprising receiving from the displayed application an identification parameter of a service provider requesting the authentication credential.

7. The method of claim 1, further comprising, in response to the operating system requesting the authentication credential:
   providing, by the operating system, an overlay user interface requesting a re-authentication credential;
   receiving, by the operating system, the re-authentication credential; and
   providing, by the operating system, the re-authentication credential to the credential management application, wherein the requested authentication credential is received in response to providing the re-authentication credential.

8. The method of claim 7, wherein the re-authentication credential comprises a personal identification number (PIN), a fingerprint, or a retina scan.

9. The method of claim 7, wherein receiving the re-authentication credential by the operating system comprises coupling a personal computer device with a second factor authentication device, the second factor authentication device including a user identification.

10. The method of claim 1, wherein retrieving the authentication credential from the credential application comprises retrieving the authentication credential from one of a plurality of credential management applications.

11. The method of claim 1, wherein detecting the field configured to receive the authentication credential comprises receiving, by the operating system, a request for the authentication credential when an active application detects a code line for entering the authentication credential.

12. A system, comprising:
   a memory comprising instructions;
   a processor configured to execute the instructions to:
   detect, in a displayed application by an operating system, a field configured to receive an authentication credential;
   in response to detecting the field and before the field receives the authentication credential:
   1) retrieve, by the operating system, an identification parameter of a service provider requesting the authentication credential,
   2) identify, by the operating system, a credential management application configured to provide the authentication credential,
   3) request, by the operating system, the authentication credential from the credential management application using the identification parameter of the service provider, and
   4) receive, at the operating system, the requested authentication credential; and
   provide, by the operating system, the authentication credential for entry into the field as a redacted text inaccessible to a peripheral device.

13. The system of claim 12, wherein the processor is further configured to execute instructions to search, by the credential management application, for the authentication credential in a database of authentication credentials using the identification parameter of the service provider requesting the authentication credential.

14. The system of claim 12, wherein the processor is further configured to activate the credential management application in response to the request by the operating system when the credential management application is inactive.

15. The system of claim 12, wherein the field is configured to provide the authentication credential to a remote server providing a service.

16. A non-transitory machine-readable storage medium comprising machine-readable instructions for causing a processor to execute a method, the method comprising:
   detecting, by an operating system, a field configured to receive an authentication credential;
   in response to detecting the field and before the field receives the authentication credential:
   1) identifying, by the operating system, a credential management application configured to provide the authentication credential,
   2) receiving, by the operating system, an identification parameter of a service provider requesting the authentication credential,
   3) requesting, by the operating system, the authentication credential from the credential management application using the identification parameter of the service provider, wherein when the credential management application is inactive, the operating system loads the credential management application in response to the request, and
   4) receiving, at the operating system, the requested authentication credential; and
   providing, by the operating system, the authentication credential for entry into the field as a redacted text inaccessible to a peripheral device.

17. The non-transitory machine-readable medium of claim 16, further comprising, in response to the operating system requesting the authentication credential:
   providing, by the operating system, an overlay user interface requesting a re-authentication credential;
   receiving, by the operating system, the re-authentication credential; and
   providing, by the operating system, the re-authentication credential to the credential management application, wherein the requested authentication credential is received in response to providing the re-authentication credential.

18. The non-transitory machine-readable medium of claim 17, wherein the re-authentication credential comprises a personal identification number (PIN), a fingerprint, or a retina scan.

19. The non-transitory machine-readable medium of claim 17, wherein receiving the re-authentication credential by the operating system comprises coupling a personal computer device with a second factor authentication device, the second factor authentication device including a user identification.

20. The non-transitory machine-readable medium of claim 16, wherein detecting the field configured to receive the authentication credential comprises receiving, by the operating system, a request for the authentication credential when an active application detects a code line for entering the authentication credential.

\* \* \* \* \*